United States Patent
Chitrapura et al.

(10) Patent No.: US 7,991,755 B2
(45) Date of Patent: Aug. 2, 2011

(54) DYNAMICALLY RANKING NODES AND LABELS IN A HYPERLINKED DATABASE

(75) Inventors: Krishna Prasad Chitrapura, Uttar Padesh (IN); Srinivas Raaghav Kashyap, Green belt, MD (US)

(73) Assignee: International Business Machines Corporation, Armonk, NY (US)

( * ) Notice: Subject to any disclaimer, the term of this patent is extended or adjusted under 35 U.S.C. 154(b) by 1015 days.

(21) Appl. No.: 11/015,989

(22) Filed: Dec. 17, 2004

(65) Prior Publication Data
US 2006/0136098 A1    Jun. 22, 2006

(51) Int. Cl.
G06F 7/00    (2006.01)
G06F 17/30   (2006.01)

(52) U.S. Cl. ......... 707/706; 707/711; 707/790; 707/798
(58) Field of Classification Search .......... None
See application file for complete search history.

(56) References Cited

U.S. PATENT DOCUMENTS

| | | | |
|---|---|---|---|
| 6,112,202 A | | 8/2000 | Kleinberg |
| 6,233,571 B1 * | | 5/2001 | Egger et al. ............ 707/2 |
| 6,285,999 B1 | | 9/2001 | Page |
| 6,549,896 B1 * | | 4/2003 | Candan et al. ............ 707/2 |
| 7,076,483 B2 * | | 7/2006 | Preda et al. ............ 707/5 |
| 2002/0129014 A1 * | | 9/2002 | Kim et al. ............ 707/5 |
| 2002/0130907 A1 * | | 9/2002 | Chi et al. ............ 345/853 |
| 2003/0018636 A1 * | | 1/2003 | Chi et al. ............ 707/6 |
| 2003/0204502 A1 * | | 10/2003 | Tomlin et al. ............ 707/5 |
| 2005/0086260 A1 * | | 4/2005 | Canright et al. ............ 707/104.1 |
| 2006/0074903 A1 * | | 4/2006 | Meyerzon et al. ............ 707/5 |
| 2007/0067317 A1 * | | 3/2007 | Stevenson ............ 707/100 |

OTHER PUBLICATIONS

Haveliwala, Taher H., "Topic-Sensitive PageRank: A Context-Sensitive Ranking Algorithm for Web Search", *Proceedings of the Eleventh International World Wide Web Conference*, Honolulu, Hawaii, May 2002.

* cited by examiner

*Primary Examiner* — Charles Rones
*Assistant Examiner* — Charles D Adams
(74) *Attorney, Agent, or Firm* — Gibb I.P. Law Firm, LLC; Derek S. Jennings

(57) ABSTRACT

The World Wide Web (WWW) can be modelled as a labelled directed graph G(V,E,L), in which V is the set of nodes, E is the set of edges, and L is a label function that maps edges to labels. This model, when applied to the WWW, indicates that V is a set of hypertext documents or objects, E is a set of hyperlinks connecting the documents in V, and the edge-label function represents the anchor-text corresponding to the hyperlinks. One can find a probabilistic ranking of the nodes for any given label, a ranking of the labels for any given node, and rankings of labels and pages using flow based models. Further, the flows can be computing using sparse matrix operations.

13 Claims, 2 Drawing Sheets

Index for storing sparse matrix B

Reverse Index from labels ($l$) to sparse matrix $V_l$

Index for storing sparse matrix B

DYNAMICALLY RANKING NODES AND LABELS IN A HYPERLINKED DATABASE

FIELD OF THE INVENTION

The present invention relates to ranking nodes and labels in a hyperlinked database.

BACKGROUND

Page (U.S. Pat. No. 6,285,999 issued Sep. 4, 2001 to Lawrence Page, and entitled "Method for mode ranking in a linked database") originally proposed a ranking measure referred to as PageRank. This ranking measure involved a node-to-node weight propagation scheme. The PageRank, or relative importance of a page (node), corresponds to a stationary distribution of probabilities. This probability distribution is that generated by a random walker surfing pages by randomly following out-links, or occasionally jumping to a random page. Page's method provides a static ranking of the popularity of pages independent of the query. But, in a typical application such as a search engine, there is a need to model the relevance of the query to a page while returning the ranked list of result pages.

The problem of ranking documents for a given query is also well studied. Several methods that consider document structure have been proposed. The HITS algorithm proposed by Kleinberg (U.S. Pat. No. 6,112,202 issued Aug. 29, 2000 to Jon Michael Kleinberg and entitled "Method and system for identifying authoritative information resources in an environment with content-based links between information resources") requires access to a search engine, which returns a subset of results for a query. Their methods can then be used to select and rank relevant pages from these results. The main drawback of the Kleinberg's approach relates to performance. The time taken to retrieve the results, extract the links and perform the relevant link analysis, for each and every query is comparatively slow due to the computational demands associated with this activity.

Accordingly, a need exists in view of these and other observations, for an improved manner of ranking nodes and labels in a hyperlinked database.

SUMMARY

Scalable and dynamic ranking of pages for online queries is described herein. The World Wide Web (WWW) can be modelled as a labelled directed graph G(V,E,L), in which V is the set of nodes, E is the set of edges, and L is a label function that maps edges to labels. This model, when applied to the WWW, indicates that V is a set of hypertext pages, E is a set of hyperlinks connecting the hypertext pages, and the label function L represents the anchor-text corresponding to the hyperlinks on the hypertext pages. One can determine probabilistic measures relating to the directed graph. One application of such measures is to generate rankings of these probabilistic measures. Examples include rankings of the nodes for any given label, the labels for any given node, and of labels and pages. Other measures and rankings are of course possible.

Computations for the labelled directed graph G(V,E,L) are performed iteratively. Each time step, every node of set V accepts flow from its incoming edges of set E and disperses "old" value to its neighbors through its outgoing edges from the set E. A node that has no incoming edges never receives any flow. A node that has no outgoing edges does not propagate its old value, which is "lost" from the system; that is, the node simply discards the old value and accepts the new value. Further, a flow is associated with each label l in the system. At each time step, for each edge bearing the label l (the particular label for which one computes the flow) a unit of flow is added to the new value of the node to which this labelled edge points.

Typically, nodes are initialised with zero values and these labelled edges introduce values into the network. This flow network evolves over time. The value of the total flow in the network increases with time, and in some cases the flow values at all the nodes saturate. The flow value in the system increases without bound in some other cases. Several useful quantities can in both cases be determined by observing the flow values for a label at a node. A variety of ranking measures (denoted as $Pr(n|l)$, $Pr(l|n)$, $Pr(l)$ and $Pr(n)$, as described herein) can be determined.

The original graph structure need not be modified, unlike use of Lawrence Page's PageRank described above. Also, the original graph structure need not be dynamically created from a search engine, as is the case with Kleinberg's HITS algorithm also described above.

The techniques described herein can be used for mining topics of a WWW page in the ranking of WWW pages based on their authority on topics, detecting new topics, and their ranking and overall popularity of WWW pages. These rankings are particularly useful in enhancing the precision of search engine results and also for market intelligence applications such as ranking of market "buzz". Though the techniques described herein concerning labelled directed graphs has immediate application to the WWW or a hyperlinked database, other "connected" systems can benefit from the computational techniques described herein.

DETAILED DESCRIPTION

Figure 1A:
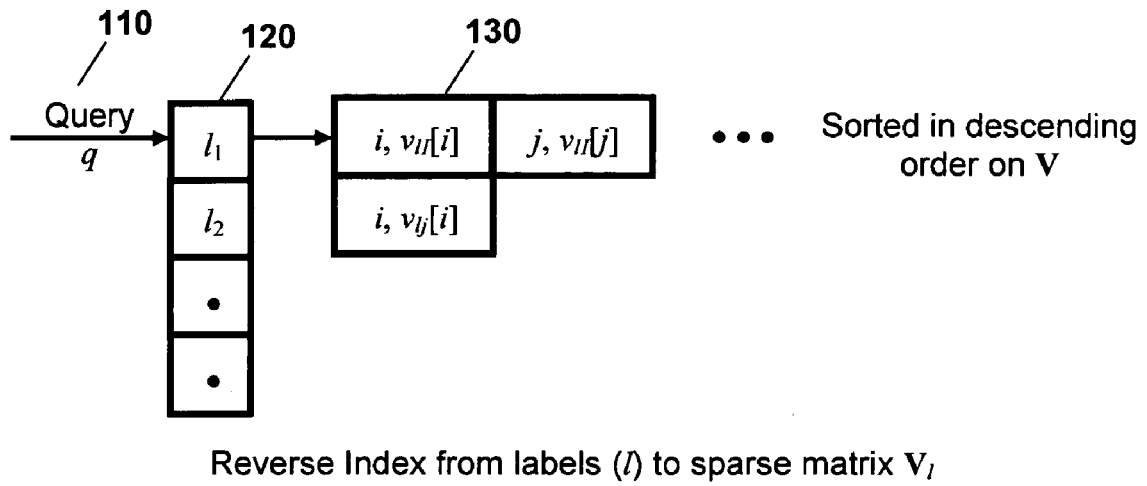
FIGS. 1A and 1B are schematic representations of how probabilistic measures are computed for ranking in a search engine application.

A labelled directed graph G(V,E,L) is used as the model for the computations described herein. The directed graph G(V, E,L) is a mathematical object in which V is the set of nodes, E is the set of edges, and L is a label function that maps edges to labels. Probabilistic rankings concerning nodes and labels are determined based upon the described computations that allow the determination of probabilistic measures, which are outlined below.

Probabilistic Measures $Pr(n|l)$ A measure of importance of node n to label l. This measure provides the ranking of pages for any given term (l). This measure provides an "authority score" that each page has on a given topic. This measure can be used by a search engine to rank the results based on a query. A search engine could organize its reverse index for every term l in the reverse sorted order of this measure in order to quickly return the top few popular results for any query. Such an engine can also support Boolean queries.

$Pr(l|n)$ A measure of importance of label l to node n. This measure gives the topics in which a page specializes. This measure can be used to classify the page into a broader topic/class-label.

$Pr(l)$ A measure of the overall importance of label l. This measure gives a ranking of topics. For the WWW, this measure is useful in the case of market intelligence applications that measure the effectiveness of market "buzz", namely the level of discussion surrounding a new product. Pr(n) A measure of the overall importance of node n (PageRank). This gives the overall static ranking of pages on the Web. This would be useful in building a search engine, similar to the one in described in.

Sparse matrix computations can be used to assist in compute the above measures/rankings. This approach involves three: (i) sparse matrices initial sparse adjacency matrix, (ii) the final resultant matrix and (iii) a temporary matrix. Any of the above measures can be computed using a final sparse vector multiplication on the resultant matrix and a vector representing initial distribution of labels.

The measures Pr(n) and Pr(l) enumerated above can be computed for any arbitrary graph. Measures for Pr(n|l) and Pr(l|n), however, can be determined whenever they exist (conditions for which are described below). The above measures can be computed and applied to a variety of applications in areas such as search engines for the internet and intranets, opinion tracking in social networks, importance ranking of customers in relational tables of a Customer Relationship Management (CRM) application, amongst other applications.

Iterative Computation

The flow model described herein can be implemented using an iterative scheme. Define a vector $v_l$ in Equation [1] below.

$$v_l[i] = \Sigma_{E'} 1$$

where $(j,i) \in E' \subseteq E$ iff $L((j,i)) = l$  [1]

The vector $y_{t+1}$ of flow values at the nodes at time t+1 is computed by the following iterative algorithm of Equation [2] below.

$$y[i]_{t+1} = v_l[i] + \sum_{j,(j,i) \in G} \frac{1}{\text{outdegree}(j)} y[j]_t$$  [2]

$$y_0 = 0_{n \times 1}$$

The following definition introduces the transition matrix $W_G$ associated with a given G.

Definition 1

$$W_G = \begin{bmatrix} w_{11} & \cdots & w_{1n} \\ \vdots & \vdots & \vdots \\ w_{n1} & \cdots & w_{nn} \end{bmatrix}$$  [3]

Equation [3] above defines $W_G$ as the n×n transition matrix for G. Transitions out of out-degree zero nodes in G are partially defined (corresponding column-sums are less than 1). Transitions out of all other nodes are fully defined (corresponding column-sums are equal to 1). Equation [4] applies for all columns j.

$$\Sigma_i W_{ij} = 1 \text{ if outdegree}(j) \geq 1.$$

$$0 \leq \Sigma_i w_{ij} < 1 \text{ if outdegree}(j) = 0.$$  [4]

One can set $w_{ij} = 1/\text{outdegree}(j)$ if $(j,i) \in G$ and 0 otherwise. If one wishes to add random jumps (that is, transitions from node j to node i when $(j,i) \notin G$), then $w_{ij} = \alpha/N + (1-\alpha)(1/\text{outdegree}(j))$ if $(j,i) \in G$ and $\alpha/N$ otherwise. Here $\alpha \in [0,1]$ is the probability of a random jump (for example, $\alpha = 0.1$). The definition above is one possible way of setting up an appropriate $W_G$ for a given G. The iteration above can be succinctly expressed in Equation [5] below.

$$Y_{t=1} = v_l + W_G Y_t = v_l + W_G v_l + \ldots + W_G^{t+1} v_l$$  [5]

All nodes are initialised with zero values, $W_G$ is an appropriately defined n×n transition matrix (referring to Definition 1) and vector $y_{t+1}$ corresponds to the flow values at the nodes after t+1 iterations.

Definition 2

There is a relationship between the model described herein and Markov Processes. Consider a Markov Process whose transition matrix is given in Equation [6] below.

$$\hat{W} = \begin{bmatrix} W_G & 0 \\ R & 1 \end{bmatrix}_{(n+1) \times (n+1)}$$  [6]

The $W_G$ submatrix of $\hat{W}$ is the same as the n×n $W_G$ matrix in Definition 1 above. R is a 1×n matrix suitably chosen so that $\hat{W}$ is column-stochastic. The last column of $\hat{W}$ has zeros in rows 1 through n and a one in row n+1.

An absorbing state is added to the system (that is, a state which once entered cannot be exited). Note that if $W_G$ were column stochastic to begin with, the system never enters the newly added absorbing state. However, if $W_G$ has nodes such that transitions out of these nodes are partially defined, then all such partially defined states (nodes) can reach the newly added absorbing state. Moreover, if all the nodes in $W_G$ reach one or more of these partially defined states, then the system eventually ends up in the newly added absorbing state. In case all the nodes in $W_G$ can reach the newly added absorbing state, the bulleted points below are established by Markov theory.

The nodes of $W_G$ represent transient states (Any state that is not absorbing is called transient).

The (i, j) entry of the quantity $(I-W_G)^{-1}$ (also called the fundamental matrix) is the expected number of time periods spent in node i before reaching an absorbing state given that the process was started off in node j.

There exists a $p_0$ such that for all $$p \geq p_0, \hat{W}^P = \hat{W}^{p_0} = \begin{bmatrix} 0_{n \times (n+1)} \\ 1_{1 \times (n+1)} \end{bmatrix}_{(n+1) \times (n+1)}$$

As usual, $\hat{W}^P$ is the $p^{th}$ power of the $\hat{W}$ matrix in Definition 2.

Theorem 1

Theorem 1 establishes a sufficient condition for the flow values at the nodes in the network to saturate. The flow values in network G saturate if every node in G can reach an out-degree zero node in G using transitions defined in $W_G$.

Proof. Define matrix $\hat{W}$ as in Definition 2. The matrices R and $W_G$ have the same definition as in Definition 2. Now, if all the nodes in G can reach an out-degree zero node in G using transitions in $W_G$, then all states (nodes) in $W_G$ are transient and can reach the newly added absorbing state in $\hat{W}$. If all the transient states (nodes) in $W_G$ can reach the newly added absorbing state, Markov theory indicates that $\exists_{p_o}$ such that $\forall_p \geq p_o$ obey the relation of Equation [7] below.

$$\hat{W}^P = \hat{W}^{P0} = \begin{bmatrix} 0_{n \times (n+1)} \\ 1_{1 \times (n+1)} \end{bmatrix}_{(n+1) \times (n+1)} \quad [7]$$

The result of Equation [8] below can also easily be verified, where Q is some 1×n matrix.

$$\hat{W}^P = \begin{bmatrix} W_G^P & 0 \\ Q & 1 \end{bmatrix} \quad [8]$$

So $W_G^P$ is the zero matrix for any $p \geq p_o$. Therefore, from Equation [5] one can establish that after p iterations $\forall_p \geq p_o$, $y_p = y_{po}$ That is, the amount of flow at any node remains constant from one iteration to the next.

Note that in the theorem above, even if in G some nodes are unable to reach an out-degree zero node, by adding random jumps to $W_G$ all nodes in G can reach an out-degree zero node in G. So all that is required for convergence (provided random jumps are added) is at least one out-degree zero node in G. So random jumps can be used to enable the algorithm to converge on a larger class of graphs.

At steady state, the amount of flow leaving the out-degree zero nodes in G given by Equation [9] below, which is equal to the amount of flow entering the system given by $\|v_l\|_1$ $$\left\|(\hat{W})^{po} \begin{bmatrix} v_l \\ 0 \end{bmatrix}\right\|_l = \|v_l\|_1 \quad [9]$$

PageRank

PageRank corresponds to the stationary distribution of a Markov process with a transition matrix $W_G$ as defined in Definition 1. The PageRank of a page is the probability of finding a random walker with transition probabilities as defined in $W_G$ at that page. Markov theory indicates that if the transition matrix $W_G$ for a Markov process is regular (that is, some power of $W_G$ has only positive entries), then there exists a unique steady state distribution for the process. For regular $W_G$, the Markov process reaches this unique steady state distribution irrespective of the initial probability distribution. PageRank essentially relies on these properties of regular Markov systems to obtain the steady state distribution for the nodes in G. When the transition matrix $W_G$ is regular, this steady state distribution also corresponds to the principal eigenvector of $W_G$. Definition 3 below codifies these facts.

Definition 3

G is PageRank-able if PageRank is well defined for G, if for the corresponding $W_G$, $\exists$ a $p_0$ such that $\forall p \geq p_0$ Equation [10] below holds.

$$W_G^P = W_G^{p0} = \begin{bmatrix} c_1 & \cdots & c_1 \\ \vdots & \vdots & \vdots \\ c_n & \cdots & c_n \end{bmatrix}_{n \times n} \quad [10]$$

The vector $$c = \begin{bmatrix} c_1 \\ \vdots \\ c_n \end{bmatrix}$$

is a principal eigenvector of $W_G$ with an associated eigenvalue of 1, where $\|c\|_1 = 1$.

Lemma 1

The total value in the system increases without bound if G is PageRank-able. If G is PageRank-able, then the flow values in network G do not saturate.

Proof. From Definition 3, G is PageRank-able, then $\exists_{p0}$ such that $\forall p \geq po$, $W_G^P = W_G^{po} \neq 0_{n \times n}$. Therefore the vector of flow values continue to increase from one iteration to the next, and the flow values in network G do not saturate.

The change in flow at node i from iteration t to iteration t+1 is $y[i]_{t+1} - y[i]_t$, where $y_t$ and $y_{t+1}$ are the vectors of flow values at the nodes after t and t+1 iterations respectively. The lemma below shows that when G is PageRank-able, the change in flow at any node can be used to find PageRank.

Lemma 2

For PageRank-able G, the quantity $$\frac{y[i]_{t+1} - y[i]_t}{\|v_i\|_1}$$

equals PageRank(i), for sufficiently large t.

Proof: The change in flow values at the nodes is given by $Y_{t+1} - y_t = W_G^{t+1} v_l$ For PageRank-able G, from Definition 3 $\exists po$ such that $\forall p \geq po$, $$W_G^P = W_G^{P0} = \begin{bmatrix} c_1 & \cdots & c_1 \\ \vdots & \vdots & \vdots \\ c_n & \cdots & c_n \end{bmatrix}.$$

So for sufficiently large t, the quantity $W_G^{t+1} = W_G^{po}$. For such a t, the quantity $W_G^{t+1} v_l = W_G^{po} v_l = \|v_l\|_1 c$. Where $$c = \begin{bmatrix} c_1 \\ \vdots \\ c_n \end{bmatrix}$$

is the principal eigenvector of $W_G$. Therefore, $y[i]_{t+1} - y[i]_t = (W_G^{t+1} v_l)[i] = (W_G^{po} v_l)[i] = \|v_l\|_1 \cdot c_i$. Where $c_i$ is the PageRank of i i.e. the $i^{th}$ entry of the principal eigenvector of $W_G$.

G is not PageRank-able when G has one or more out-degree zero nodes, since the corresponding $W_G$ is not regular. When G is PageRank-able, the model described herein can only find PageRank. Experiments have shown, however, that the graph has a bowtie structure. A graph with such a structure is not PageRank-able due to the presence of a large number of out-degree zero nodes. However, the graph satisfies the sufficient condition for convergence outlined in Theorem 1.

As a result, the techniques described herein can be applied to the graph per se. When G satisfies the sufficient condition in Theorem 1, different choices of l lead to different results.

An iterative scheme for a fixed label can be used to find the flow values at the nodes for a fixed label, and one can use the following iterative scheme. Define a vector $v_l$ as per Equation [11] below.

$$v_l[i] = \sum_{E'} 1 \text{ where } (j,i) \in E' \subseteq \text{EiffL}((j,i)) = l. \qquad [11]$$

The vector y of label biased node ranks is then computed by the following iterative algorithm of Equation [12] below.

$$y_{t+1} = v_l + \beta_G y_s \qquad [12]$$

In Equation [12] above, $\beta \in [0,1]$ and $W_G$ is a suitably defined n×n matrix as in definition 1. Choosing $\beta < 1$ ensures convergence irrespective of the choice of $W_G$ and $v_l$. The iterative algorithm seeks to find the steady state vector $y_s$ for this iteration, as expanded in Equation [13] below.

$$\begin{aligned} y_s &= v_l + \beta W_G y_s \\ &= (I - \beta W_G)^{-1} v_l \\ &= (I + \beta W_G + (\beta W_G)^2 + (\beta W_G)^3 \ldots) v_l \end{aligned} \qquad [13]$$

In practice, the iterative algorithm declares a solution once $\|y_{t+}-y_t\|_2 \leq \in$ or when the ranks of the top few nodes remain unchanged from one iteration to the next.

The condition for the expected values at each node to stabilize is that the quantity $(I-\beta W_G)^{-1}$ must exist. The quantity $(I-\beta W_G)^{-1}$ is guaranteed to exist and our iterative algorithm is guaranteed to converge if $\|\beta W_G\| < 1$, where $\|\beta W_G\| = \beta \max_j \Sigma_i |w_{ij}|$. Since $\beta < 1$ and $\Sigma_i |W_{ij}| \leq 1$ for all i, $\|\beta W_G\| < 1$ and the calculations converge. The $\beta$ term acts like a damping factor and its value can be set as close to 1 as required so that $\|(1-\beta)W_G\| \leq \in$ (for instance choose $\beta \geq 1- \in/N$ for the Frobenius norm).

The $\beta$ premultiplier is not required to ensure convergence if $W_G$ satisfies the convergence criterion of Theorem 1. Choosing a small $\beta$, however, speeds up convergence.

Calculating the Reachability Matrix B

Computing the steady state flows at all the nodes for a fixed label is described above. The flows across all the nodes are computed for a large number of labels. Therefore, a matrix called B is computed, which indicates the "reachability" between pair of nodes in the graph through all possible paths.

The (i, j) entry in a reachability matrix encodes the total flow that node i observes given that a unit of flow is sent out from node j. This entry is a measure of the effect node j has on node j. If the maximum length of influence paths that are considered is fixed as $t_{max}$, a good approximation to the reachability matrix can be found efficiently provided $t_{max}$ is small. Since N is very large and $t_{max}$ is a small fixed number, one can ignore the effect of random jumps (namely, transitions from node j to node i when $(j,i) \notin G$). Once such an approximate reachability measure is precomputed, given any label a suitable vector $v_l$ can be found and node ranks for the given label can be computed.

The matrix B denotes such an approximate reachability measure between every pair of nodes in G. The main challenge in computing the B matrix is one of scale. Some applications may have close to 1 billion nodes and 25 billion edges. Say $|V|=n$ and $|E|=m$. Clearly, storing G (ignoring L) alone requires O (m+n) storage space. Further, the sparsity of B dictates a lower bound on the space required to compute and store B. The challenge now is to compute and store B using space and time close to the sparsity induced lower bound. Define a matrix W according to Equation [14] below.

$$W_{ij} = \begin{cases} \dfrac{1}{\text{outdegree}(j)} & \text{when}(j,i) \in G \\ 0 & \text{otherwise} \end{cases} \qquad [14]$$

Define B to be a reachability measure according to Equation [15] below where $B_{ij}$ represents the total influence that node j exerts on node i.

$$B = I + W + W^2 + W^3 + \ldots + W^{t_{max}} \qquad [15]$$

Note that I represents influences through paths of length zero, W represents influences through paths of length one and so on.

Matrix B is calculated using an iterative algorithm. The number of iterations of this algorithm corresponds to the maximum length of influence paths one wishes to consider. This calculation proceeds as indicated in Equation [16] below.

$$B(0) = W$$

$$B(t+1)_{ij} = W_{ij} + \Sigma_{(k,i) \in G, (j,k) \in B} B(t)_{jk} W_{ki} \qquad [16]$$

After the final iteration I is added to B. To compute B (t+1), B (t) and W are stored. The following lemma establishes the equivalence of the matrix B in [15] and the matrix B computed by the iterative algorithm above in [16].

Lemma 3

At the end of iteration t, any $B_{ij}$ entry corresponds to the total influence of node j on node i through all paths of length 1 through t from node j to node i. This scheme appears to be best realized by storing B and W as sparse indexes where for each node j one can query and obtain a list of nodes pointed to by node j. The underlying mechanism responsible for storing such a forward index might also prune some out-edges from time to time to meet storage constraints.

Probabilities (ranking measures Pr(n|l), Pr(l|n), Pr(l) and Pr(n)) can be computed by first computing vectors $y_t$, which stores the steady state flows at every node for each label l, and later computing the probabilities from the set of $y_t$ vectors. The initial label distribution $v_l$ for each label l is computed using Equation [17] below. From Equation [17] the result of Equation [18] below can be discerned.

$$y_l^{(n \times 1)} = B^{(n \times n)} v_l^{(n \times 1)} \qquad [17]$$

Now, if L denotes the set of all labels in the system, then Equation [18] below follows.

$$\begin{aligned} Pr(n|l) &= \frac{y_l[n]}{\sum_{i \in v} y_l[i]} \\ Pr(l|n) &= \frac{y_l[n]}{\sum_{a \in L} y_a[n]} \\ Pr(l) &= \frac{\sum_{i \in v} y_l[i]}{\sum_{a \in L} \sum_{i \in v} y_a[i]} \text{ and} \\ Pr(n) &= \frac{\sum_{a \in L} y_a[n]}{\sum_{a \in L} \sum_{i \in v} y_a[i]} \end{aligned} \qquad [18]$$

Note that for the sake of ranking, only the sorted numerators in Equation [18] are considered sufficient.

Search Engine Application

Figure 1B:
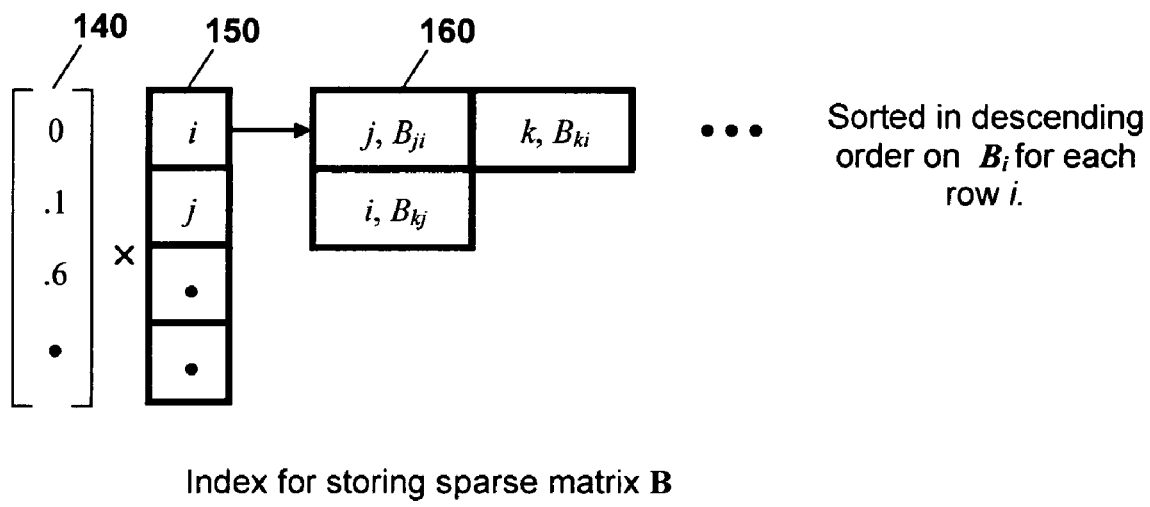

FIGS. 1A and 1B schematically represent an example for a search engine receiving a query q 110. Two indices 120, 140 can be used, as illustrated in FIGS. 1A and 1B respectively. The first is a reverse index 120, which maps each label (l) to a set of pages i, if the anchor text on the in-links of these pages contain that label l. In general, index 120 can be viewed as a mapping from labels to the nodes which are relevant to it (For example: terms in l occurs in the document representing the node). The mapping also stores the value $v_l[i]$ (which is a value that denotes how important label l is for node i) 130 and the values of the unmapped entries that are assumed to be zero. Typically, $v_l[i]$ is set to number of time l occurs either in node i or on the anchor text of links pointing to i. The second index 140 stores the sparse matrix representation of the B matrix which can look up all the pages j that are influenced by a particular page i, 150 along with the value of $B_{ij}$ 160. Non-existent j entries in the index mean that the corresponding nodes are not reachable by page i and such pages are assumed to have a reachable score of zero.

Preferably, the labels are stemmed using Porter's stemmer. The Stop-words are removed, though no synonyms are used or thesauri consulted. The indices can be saved as "flat file" indices. Given a Boolean query q 110 which has labels and Boolean operands, as a first step, the label index for the vector $v_l$ is determined for each of the labels in q and further form a vector $v_q$ based on the following rules:

if $q=l_1$ AND $l_2$, then $v_q = v_{l1} \perp v_{l2}$, which is 'fuzzy AND', $v_q[i] = \min(v_{l1}[i]; vl_2[i])$ if $q=l_1$ OR $l_2$, then $v_q = v_{l1} \emptyset v_{l2}$, which is 'fuzzy OR', $v_q[i] = \max(v_{l1}[i]; v_{l2}[i])$ The second step is a sparse matrix multiplication of the vector $v_q$ and the matrix B. A straight-forward implementation can be used, in which each entry $v_q[i]$ is multiplied with the $i^{th}$ row of the B matrix. The results are added in memory to form the vector y that contains the ranking of the documents for the query q 110. For the sake of performance, the entries in B are sorted on their magnitude, so that the top k results can be computed quickly. In theory, a sparse matrix-vector multiplication is $O(n^2)$. In practice, however, given the fact that one computes only the top k ranks is of interest, the number of entries in matrix B can be limited to the top m entries when computing the ranks.

Computer Hardware

Figure 2:
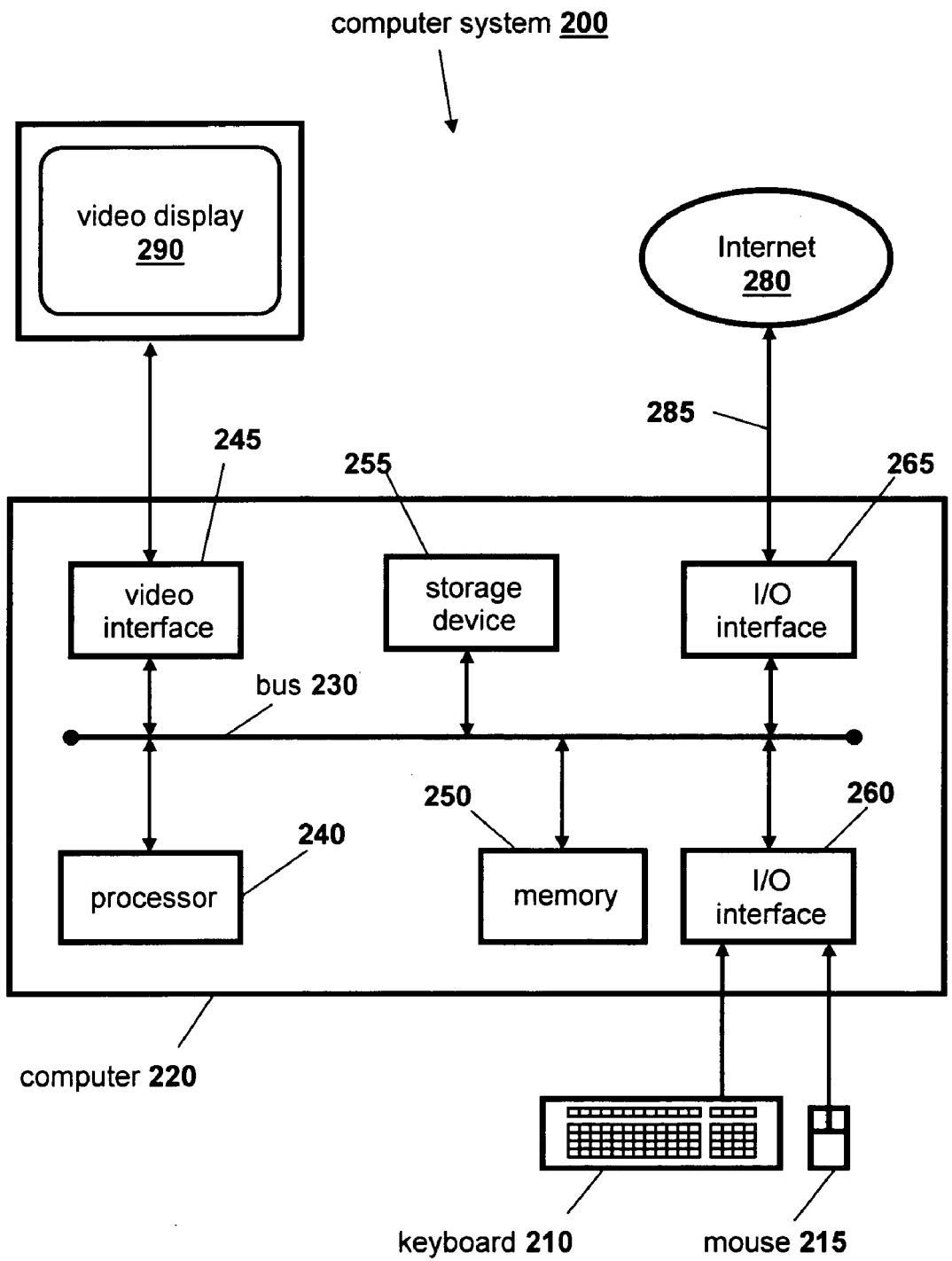
FIG. 2 is a schematic representation of a computer system suitable for performing the techniques described herein.

FIG. 2 is a schematic representation of a computer system 200 of a type that is suitable for executing computer software for ranking nodes and labels in a hyperlinked database. Computer software executes under a suitable operating system installed on the computer system 200, and may be thought of as comprising various software code means for achieving particular steps.

The components of the computer system 200 include a computer 220, a keyboard 210 and mouse 215, and a video display 290. The computer 220 includes a processor 240, a memory 250, input/output (I/O) interfaces 260, 265, a video interface 245, and a storage device 255.

The processor 240 is a central processing unit (CPU) that executes the operating system and the computer software executing under the operating system. The memory 250 includes random access memory (RAM) and read-only memory (ROM), and is used under direction of the processor 240.

The video interface 245 is connected to video display 290 and provides video signals for display on the video display 290. User input to operate the computer 220 is provided from the keyboard 210 and mouse 215. The storage device 255 can include a disk drive or any other suitable storage medium.

Each of the components of the computer 220 is connected to an internal bus 230 that includes data, address, and control buses, to allow components of the computer 220 to communicate with each other via the bus 230.

The computer system 200 can be connected to one or more other similar computers via a input/output (I/O) interface 265 using a communication channel 285 to a network, represented as the Internet 280.

The computer software may be recorded on a portable storage medium, in which case, the computer software program is accessed by the computer system 200 from the storage device 255. Alternatively, the computer software can be accessed directly from the Internet 280 by the computer 220. In either case, a user can interact with the computer system 200 using the keyboard 210 and mouse 215 to operate the programmed computer software executing on the computer 220.

Other configurations or types of computer systems can be equally well used to execute computer software that assists in implementing the techniques described herein.

CONCLUSION

Various alterations and modifications can be made to the techniques and arrangements described herein, as would be apparent to one skilled in the relevant art.

We claim:

1. A method for computing probabilistic measures for a labeled directed graph, said method comprising:

accessing, by a processor, data representative of a labelled directed graph of nodes and labels on said nodes connected by directed edges;

computing, by said processor for said directed graph, flow values across all of said nodes for said labels;

iteratively determining, by said processor from the directed graph, a matrix of values representative of the influence between pairs of nodes in said directed graph, wherein each entry in said matrix is determined based on said flow values, comprises a reachability measure from a first node to a second node in a given pair of nodes through all of multiple possible paths between said first node and said second node and encodes a total flow value observed by said second node when a unit of flow is sent from said first node to said second node such that said reachability measure indicates the effect that said first node has on said second node, wherein at least some of said paths have different lengths, wherein a number of iterations used, during said iteratively determining, is limited to a user-selected maximum path length to be considered, and wherein said matrix is stored as a sparse matrix in which $B_{ij}$ represents the total influence that node j exerts on node i, as measured by equation $B = I + W + W_2 + W_3 + \ldots W_{tmax}$, where I, W, $W_2$, $W_3$, and $W_{tmax}$ represent influences through paths of length zero, one, two, three, and said user-selected maximum path length, respectively;

determining, by said processor from said matrix and from a distribution of a particular label in said directed graph, multiple probabilistic measures associated with said nodes and said labels of said directed graph, wherein said probabilistic measures comprise at least a measure of the importance of a node, a measure of the importance of a label, a measure of the importance of a node to a label and a measure of the importance of a label to a node; and generating rankings by said processor based on said probabilistic measures, said generating comprising at least ranking of said nodes for any given label, ranking of said labels for any given node, ranking of said labels and ranking of said nodes.

2. The method according to claim 1, further comprising computing, by said processor, flow vectors for the directed graph that represent said flows, wherein said computing of said flow vectors comprises, for each labeled edge bearing a first label of said labels, adding one unit of flow to each node of said nodes to which said labeled edge points.

3. The method according to claim 2, further comprising computing, by said processor, a steady state vector based upon a transition matrix that defines flow from nodes, and a labeled node.

4. The method according to claim 1, wherein the directed graph models a hyperlinked database.

5. The method according to claim 1, wherein the directed graph models the World Wide Web (WWW).

6. The method according to claim 1, wherein the nodes model hypertext pages of the World Wide Web (WWW).

7. The method according to claim 1, wherein the directed edges model a set of hyperlinks connecting the hypertext pages of the World Wide Web (WWW).

8. The method according to claim 1, wherein the labels model anchor-text for the hyperlinks of the hypertext pages of the World Wide Web (WWW).

9. A computer program product for computing probabilistic measures for a labelled directed graph, said computer program product comprising a computer software recorded on a storage medium and accessible by a computer system for executing a method comprising:

accessing data representative of a labelled directed graph of nodes and labels on said nodes connected by directed edges;

computing, for said directed graph, flow values across all of said nodes for said labels;

iteratively determining, from the directed graph, a matrix of values representative of the influence between pairs of nodes in said directed graph, wherein each entry in said matrix is determined based on said flow values, comprises a reachability measure from a first node to a second node in a given pair of nodes through all of multiple possible paths between said first node and said second node and encodes a total flow value observed by said second node when a unit of flow is sent from said first node to said second node such that said reachability measure indicates the effect that said first node has on said second node, wherein at least some of said paths have different lengths, wherein a number of iterations used, during said iteratively determining, is limited to a user-selected maximum path length to be considered, and wherein said matrix is stored as a sparse matrix in which $B_{ij}$ represents the total influence that node j exerts on node i, as measured by equation $B = I + W + W_2 + W_3 + \ldots W_{tmax}$, where $I$, $W$, $W_2$, $W_3$, and $W_{tmax}$ represent influences through paths of length zero, one, two, three, and said user-selected maximum path length, respectively;

determining, from said matrix and from a distribution of a particular label in said directed graph, multiple probabilistic measures associated with said nodes and said labels of said directed graph, wherein said probabilistic measures comprise at least a measure of the importance of a node, a measure of the importance of a label, a measure of the importance of a node to a label and a measure of the importance of a label to a node; and generating rankings based on said probabilistic measures, said generating comprising at least ranking of said nodes for any given label, ranking of said labels for any given node, ranking of said labels and ranking of said nodes.

10. A computer system for computing probabilistic measures for a labelled directed graph, said computer system comprising a computer software program recorded on a storage medium accessible by said computer system for executing a method comprising:

accessing data representative of a labelled directed graph of nodes and labels on said nodes connected by directed edges;

computing, for said directed graph, flows values across all of said nodes for said labels;

iteratively determining, from the directed graph, a matrix of values representative of the influence between pairs of nodes in said directed graph, wherein each entry in said matrix is determined based on said flow values, comprises a reachability measure from a first node to a second node in a given pair of nodes through all of multiple possible paths between said first node and said second node and encodes a total flow value observed by said second node when a unit of flow is sent from said first node to said second node such that said reachability measure indicates the effect that said first node has on said second node, wherein at least some of said paths have different lengths, wherein a number of iterations used, during said iteratively determining, is limited to a user-selected maximum path length to be considered, and wherein said matrix is stored as a sparse matrix in which $B_{ij}$ represents the total influence that node j exerts on node i, as measured by equation $B = I + W + W_2 + W_3 + \ldots W_{tmax}$, where $I$, $W$, $W_2$, $W_3$, and $W_{tmax}$ represent influences through paths of length zero, one, two, three, and said user-selected maximum path length, respectively;

determining, from said matrix and from a distribution of a particular label in said directed graph, multiple probabilistic measures associated with said nodes and said labels of said directed graph, wherein said probabilistic measures comprise at least a measure of the importance of a node, a measure of the importance of a label, a measure of the importance of a node to a label and a measure of the importance of a label to a node; and generating rankings based on said probabilistic measures, said generating comprising at least ranking of said nodes for any given label, ranking of said labels for any given node, ranking of said labels and ranking of said nodes.

11. The computer program product according to claim 9, wherein said method further comprises computing flow vectors for the directed graph that represent flows for each label at every node, wherein said computing comprises, for each labeled edge bearing a first label of said labels, adding one unit of flow to each node of said nodes to which said labeled edge points.

12. The computer program product according to claim 11, wherein said method further comprises computing a steady state vector based upon a transition matrix that defines flow from nodes, and a labeled node.

13. The method according to claim 1, further comprising calculating values of said matrix as summation of matrices representative of the influence between pairs of node through paths of different lengths.

* * * * *